(12) United States Patent
Wu

(10) Patent No.: US 10,332,700 B2
(45) Date of Patent: Jun. 25, 2019

(54) THIN KEYBOARD SWITCH

(71) Applicant: DONGGUAN CITY KAIHUA ELECTRONICS CO., LTD, Dongguan, Guangdong (CN)

(72) Inventor: Fuxi Wu, Guangdong (CN)

(73) Assignee: DONGGUAN CITY KAIHUA ELECTRONICS CO., LTD., Dongguan, Guangdong (CN)

( * ) Notice: Subject to any disclaimer, the term of this patent is extended or adjusted under 35 U.S.C. 154(b) by 0 days.

(21) Appl. No.: 15/911,640

(22) Filed: Mar. 5, 2018

(65) Prior Publication Data

US 2018/0197700 A1 Jul. 12, 2018

Related U.S. Application Data

(63) Continuation of application No. PCT/CN2016/098097, filed on Sep. 5, 2016.

(30) Foreign Application Priority Data

Sep. 6, 2015 (CN) .................... 2015 2 0679828 U

(51) Int. Cl.
*H01H 13/72* (2006.01)
*H01H 13/7065* (2006.01)
(Continued)

(52) U.S. Cl.
CPC ......... *H01H 13/7065* (2013.01); *G06F 3/023* (2013.01); *H01H 3/12* (2013.01);
(Continued)

(58) Field of Classification Search
CPC .... H01H 13/70; H01H 2231/048; H01H 9/26; H01H 13/72; H01H 13/76; H01H 13/705;
(Continued)

(56) References Cited

U.S. PATENT DOCUMENTS 5,278,372 A * 1/1994 Takagi .................. H01H 3/125
200/344
2014/0110234 A1 4/2014 Khor

FOREIGN PATENT DOCUMENTS

CN 101393809 3/2009
CN 201435329 3/2010
(Continued)

OTHER PUBLICATIONS

Written Opinion and International Search Report for International application No. PCT/CN2016/098097, dated Nov. 25, 2016; 11 pages (English and Chinese).

*Primary Examiner* — Anthony R Jimenez
(74) *Attorney, Agent, or Firm* — Rankin, Hill & Clark LLP

(57) ABSTRACT

A thin keyboard switch includes a keycap, a housing, an elastic body, an elastic contact body, a balancing frame, and a base disposed on a printed circuit board (PCB). A base groove fitting with the elastic contact body is provided at the center of the base, the elastic contact body is disposed at the bottom portion inside the base groove, and the elastic contact body is electrically connected to the PCB. The housing and the base are disposed in a tightly gripping manner. The elastic body protrudes from the housing and is connected to the keycap, and the keycap is mounted on the balancing frame.

6 Claims, 2 Drawing Sheets

(51) Int. Cl.
*G06F 3/023* (2006.01)
*H01H 13/705* (2006.01)
*H01H 3/12* (2006.01)

(52) U.S. Cl.
CPC .......... *H01H 3/125* (2013.01); *H01H 13/705* (2013.01); *H01H 2205/016* (2013.01); *H01H 2215/006* (2013.01); *H01H 2223/054* (2013.01); *H01H 2227/026* (2013.01)

(58) Field of Classification Search
CPC ............ H01H 13/7065; A61B 18/1402; A61B 18/1442; A61B 2017/00376; A61B 2018/00607; A61B 2018/00922; A61B 2018/00946; A61B 2018/00994; A61B 2018/1455; A61B 2018/00958
USPC ......................................................... 200/5 A
See application file for complete search history.

(56) References Cited

FOREIGN PATENT DOCUMENTS

| | | |
|---|---|---|
| CN | 101847535 | 9/2010 |
| CN | 104299829 | 1/2015 |
| CN | 204927141 | 12/2015 |

\* cited by examiner

THIN KEYBOARD SWITCH

This application is a continuation of Ser. No. PCT/CN2016/098097 filed on Sep. 5, 2016, which is expressly incorporated herein by reference.

FIELD OF THE INVENTION

The present application relates to the field of electronic products, especially to a thin keyboard switch.

BACKGROUND OF THE INVENTION

Keyboards are essential parts of, and play an important role in computers. As technology develops, functions and performances of the keyboards, which has been thinner and thinner, have been improved greatly. However, keyboard switches in the prior art are normally disposed on a PCB and then fixed by a housing, which makes the thickness of the keyboard unmodifiable, therefore, the keyboards in the prior art are generally relatively thick, which keeps personal computers from being thinner. Therefore, the keyboard structure of the prior art requires to be improved.

SUMMARY OF THE INVENTION

The present application intends to provide a thin keyboard switch to deal with the problem(s) mentioned in the background.

In order to achieve the purpose, the present application provides technical solutions as follows:

A thin keyboard includes a keycap, a housing, an elastic body, an elastic contact body, a balancing frame, and a base disposed on a PCB (printed circuit board). A base groove fitting with the elastic contact body is provided at a center of the base, the elastic contact body is disposed at a bottom portion inside the base groove, and the elastic contact body is electrically connected to the PCB. The elastic body is located in the base groove and disposed on the elastic contact body. The balancing frame is mounted on an external side of the base, and located between the base and the housing. The housing and the base are disposed in a tightly gripping manner. The elastic body protrudes from the housing and is connected to the keycap, and the keycap is mounted on the balancing frame.

In another embodiment of the present application, four inner slots are provided at four corners of the base, two symmetrical second catching claws are arranged on two sides of the base and four second catching slots, which are evenly arranged on two sides of the base and corresponded with the inner slots, are also provided at four corners of the base; the second catching claws and the second catching slots are arranged on two adjacent sides of the base.

In another embodiment of the present application, the balancing frame includes a first balancing frame and a second balancing frame connected in a cross and flexible manner with the first balancing frame; two symmetrical outer shafts are arranged on outer walls of the first balancing frame and the second balancing frame; two symmetrical inner shafts are arranged at ends of inner walls of the first balancing frame and the second balancing frame; the inner shafts are flexibly mounted in the inner slots of the base.

In another embodiment of the present application, the elastic body includes an elastic pole and an elastic seat; top end of the elastic pole protrudes through the housing and is connected to the keycap; the elastic seat is contacted with the elastic contact body.

In another embodiment of the present application, an elastic hole fitting with the elastic body is provided at a center of the housing; four first catching claws fitting with the second catching slots are provided at four corners of the housing; four first catching slots fitting with the second catching claws are provided on sides of the housing.

In another embodiment of the present application, four shaft seats corresponding to the outer shafts are fixedly arranged on inner sidewalls of the keycap, which shaft seats provide rotating slots fitting with the outer shafts; the outer shafts of the first balancing frame and the second balancing frame are flexibly mounted inside the rotating slots.

Beneficial effects of the present application includes that compared with the prior art, the elastic body and the elastic contact body are arranged inside the base, the balancing frame is arranged on an outer side of the base, and the base and the balancing frame are both arranged inside the keycap. By means of the foregoing structure, the thickness of the keyboard is greatly reduced, and an ultrathin effect of the keyboard is achieved, which achieves good usage effect, and improves aesthetic appeal of the keyboard switch.

In which:
1 Housing;
11 Elastic Hole;
12 First Catching Claw;
13 First Catching Groove;
2 Elastic Body;
21 Elastic Pole;
22 Elastic Seat;
3 Elastic Contact Body;
4 Balancing Frame;
41 First Balancing Frame;
42 Outer Shaft;
43 Inner Shaft;
44 Second Balancing Frame;
5 Base;
51 Second Catching Slot;
52 Second Catching Claw;
53 Inner Slot;
54 Base Groove;
6 PCB;
7 Keycap;
71 Shaft Seat;
72 Rotating Slot.

DETAILED DESCRIPTION OF THE PREFERRED EMBODIMENT

Technical solutions in the embodiments of the present application will be described clearly and thoroughly hereinafter with reference to the accompanying drawings. Apparently, the embodiments described herein are merely parts of but not exclusive embodiments of the present application. All alternative embodiments obtained by those skilled in the art based on the embodiments of the present application without creative works shall fall within the protection scope of the present application.

Figure 1:
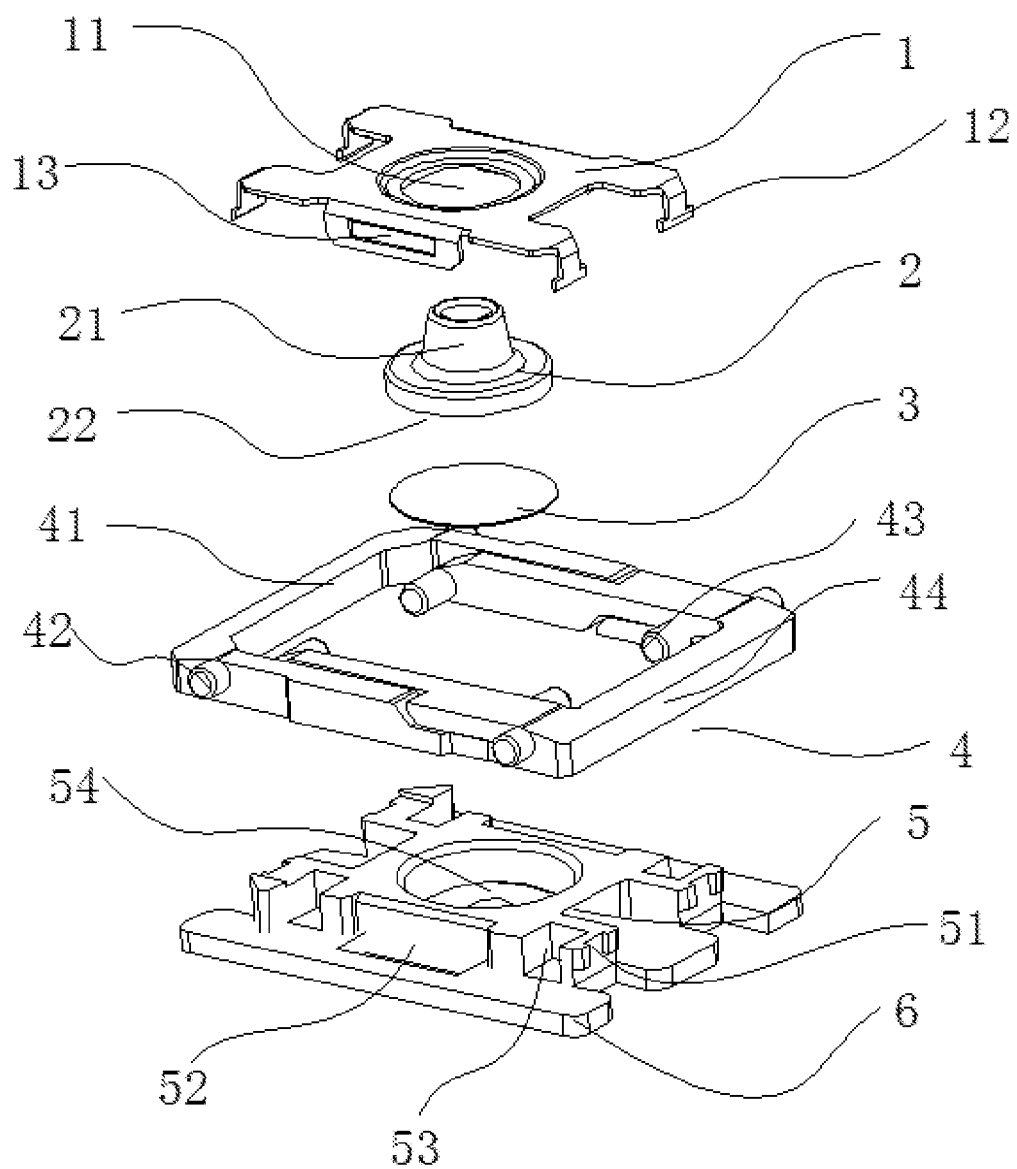
FIG. 1 shows an explosive view of a thin keyboard switch.
Figure 2:
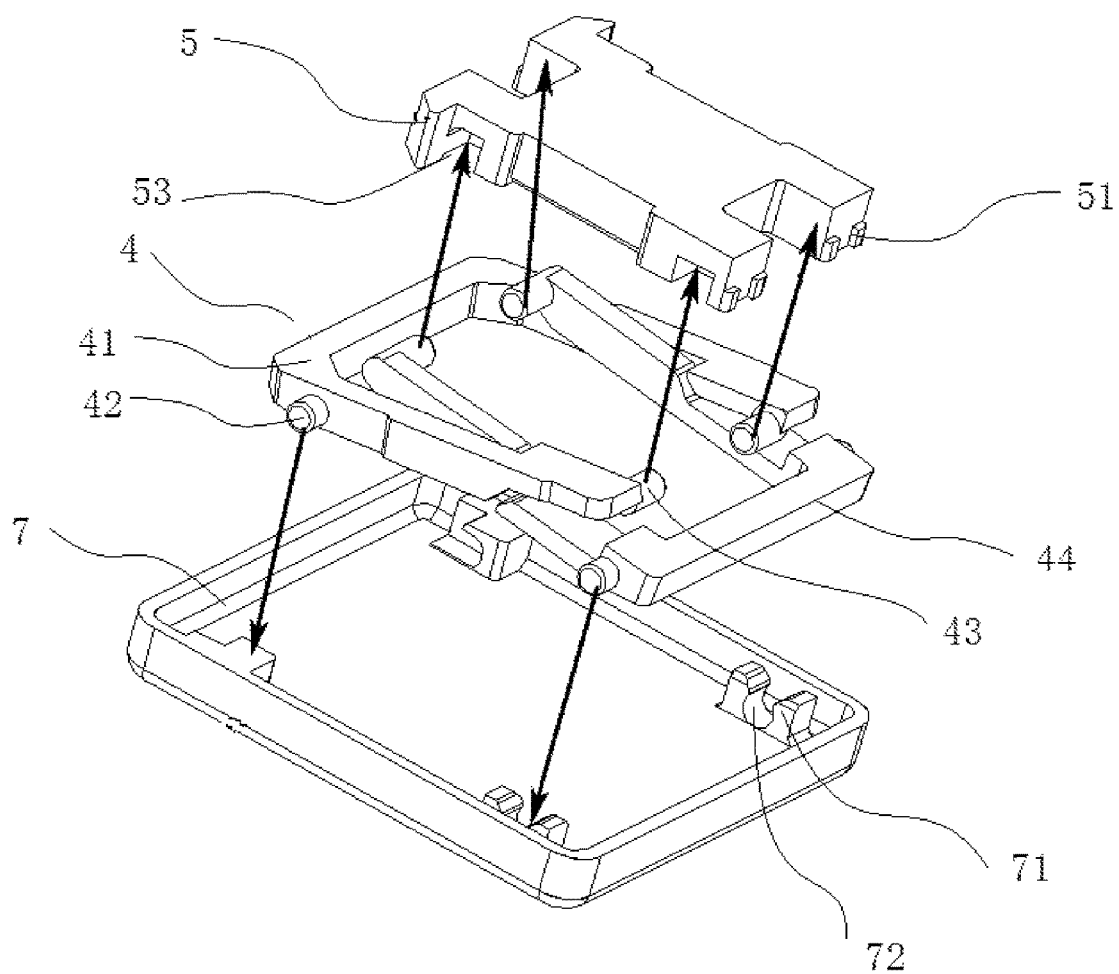
FIG. 2 shows an expanded view of a balancing frame of the thin keyboard switch.

As shown in FIGS. 1-2, in one embodiment, a thin keyboard switch including a keycap 7, a housing 1, an elastic body 2, an elastic contact body 3, a balancing frame 4, and a base 5 disposed on a PCB (printed circuit board) 6 is provided. A base groove 54 fitting with the elastic contact body 3 is provided at a center of the base 5, the elastic contact body 3 is disposed at a bottom portion inside the base groove 54, and the elastic contact body 3 is electrically connected to the PCB 6. The elastic body 2 is located in the base groove 54 and disposed on the elastic contact body 3. The balancing frame 4 is mounted on an external side of the base 5, and located between the base 5 and the housing 1. The housing 1 and the base 5 are disposed in a tightly gripping manner. The elastic body 2 protrudes from the housing 1 and is connected to the keycap 7, and the keycap 7 is mounted on the balancing frame 4.

Four inner slots 53 are provided at four corners of the base 5, two symmetrical second catching claws 52 are arranged on two sides of the base 5 and four second catching slots 51, which are evenly arranged on two sides of the base 5 and corresponded with the inner slots 53, are also provided at four corners of the base 5; the second catching claws 52 and the second catching slots 51 are arranged on two adjacent sides of the base 5.

The balancing frame 4 includes a first balancing frame 41 and a second balancing frame 44 connected in a cross and flexible manner with the first balancing frame 41; two symmetrical outer shafts 42 are arranged on outer walls of the first balancing frame 41 and the second balancing frame 44; two symmetrical inner shafts 43 are arranged at ends of inner walls of the first balancing frame 41 and the second balancing frame 44; the inner shafts 43 are flexibly mounted in the inner slots 53 of the base 5.

An elastic hole 11 fitting with the elastic body 2 is provided at a center of the housing 1; four first catching claws 12 fitting with the second catching slots 51 are provided at four corners of the housing 1; four first catching slots 13 fitting with the second catching claws 52 are provided on sides of the housing 1.

Four shaft seats 71 corresponding to the outer shafts 42 are fixedly arranged on inner sidewalls of the keycap 7, which shaft seats 71 provide rotating slots 72 fitting with the outer shafts 42; the outer shafts 42 of the first balancing frame 41 and the second balancing frame 44 are flexibly mounted inside the rotating slots 72.

The elastic body 2 forces on the elastic contact body 3 as the keycap 7 is pressed downwards, such that the elastic contact body 3 is contacted with the circuit of the PCB 6, turning on the circuit; when the keycap 7 is released, the elastic contact body 3 is detached from the PCB 6 because of an elastic stretch of the elastic body 2.

In the application, the elastic body 2 and the elastic contact body 3 are arranged inside the base 5, the balancing frame 4 is arranged on an outer side of the base 5, and the base 5 and the balancing frame 4 are both arranged inside the keycap 7. By means of the foregoing structure, the thickness of the keyboard is greatly reduced, and an ultrathin effect of the keyboard is achieved, which achieves good usage effect, and improves aesthetic appeal of the keyboard switch.

For those skilled in the art, it is apparent that the present application is not limited to the details of above exemplary embodiments, and the present application may be carried out in other ways without departing from the basic feature or spirit of the present application. Therefore, the embodiments should be deemed to be exemplary and non-limited, the scope of the present invention is defined by appended claims instead of the above description. Therefore, all variations falling within the meaning and scope of the equivalent of claims are construed to be within the coverage of the present invention. None of the figure numbers in the claims should be deemed as a limitation to the relevant claims.

In addition, it should be understood that although the specification is described based on the embodiments, some embodiments do not only include one independent technical solution. This description of the specification is merely for the sake of clarity, and those skilled in the art should consider the specification as a whole. The technical solutions in the embodiments may also be combined as appropriate to form alternative embodiments that can be understood by those skilled in the art.

What is claimed is:

1. A thin keyboard, comprising a keycap, a housing, an elastic body, an elastic contact body, a balancing frame, and a base disposed on a PCB, wherein a base groove fitting with the elastic contact body is provided at a center of the base, the elastic contact body is disposed at a bottom portion inside the base groove, and the elastic contact body is electrically connected to the PCB; the elastic body is located in the base groove and disposed on the elastic contact body; the balancing frame is mounted on an external side of the base, and located between the base and the housing; the housing is gripped by the base; the elastic body protrudes from the housing and is connected to the keycap, and the keycap is mounted on the balancing frame;

and wherein four inner slots are provided at four corners of the base; two symmetrical second catching claws are arranged on two sides of the base.

2. The thin keyboard of claim 1, wherein the balancing frame includes a first balancing frame and a second balancing frame connected in a cross and flexible manner with the first balancing frame; two symmetrical outer shafts are arranged on outer walls of the first balancing frame and the second balancing frame; two symmetrical inner shafts are arranged at ends of inner walls of the first balancing frame and the second balancing frame; the inner shafts are flexibly mounted in the inner slots of the base.

3. The thin keyboard of claim 1, the elastic body includes an elastic pole and an elastic seat; a top end of the elastic pole protrudes through the housing and is connected to the keycap; the elastic seat is contacted with the elastic contact body.

4. The thin keyboard of claim 1, wherein four shaft seats corresponding to the outer shafts are fixedly arranged on inner sidewalls of the keycap, which shaft seats provide rotating slots fitting with the outer shafts; the outer shafts of the first balancing frame and the second balancing frame are flexibly mounted inside the rotating slots.

5. The thin keyboard of claim 1, wherein four second catching slots, which are evenly arranged on two sides of the base and corresponded with the inner slots, are also provided at four corners of the base; the second catching claws and the second catching slots are arranged on two adjacent sides of the base.

6. The thin keyboard of claim 5, wherein an elastic hole fitting with the elastic body is provided at a center of the housing; four first catching claws fitting with the second catching slots are provided at four corners of the housing; four first catching slots fitting with the second catching claws are provided on sides of the housing.

* * * * *